(No Model.) 2 Sheets—Sheet 1.

R. P. SCOTT.
MACHINE FOR HULLING AND SEPARATING GREEN PEAS.

No. 387,318. Patented Aug. 7, 1888.

Witnesses:
T. R. Stuart,
L. Seward Bacon,

Inventor:
Robert P. Scott,
By Marble + Mason,
Attys.

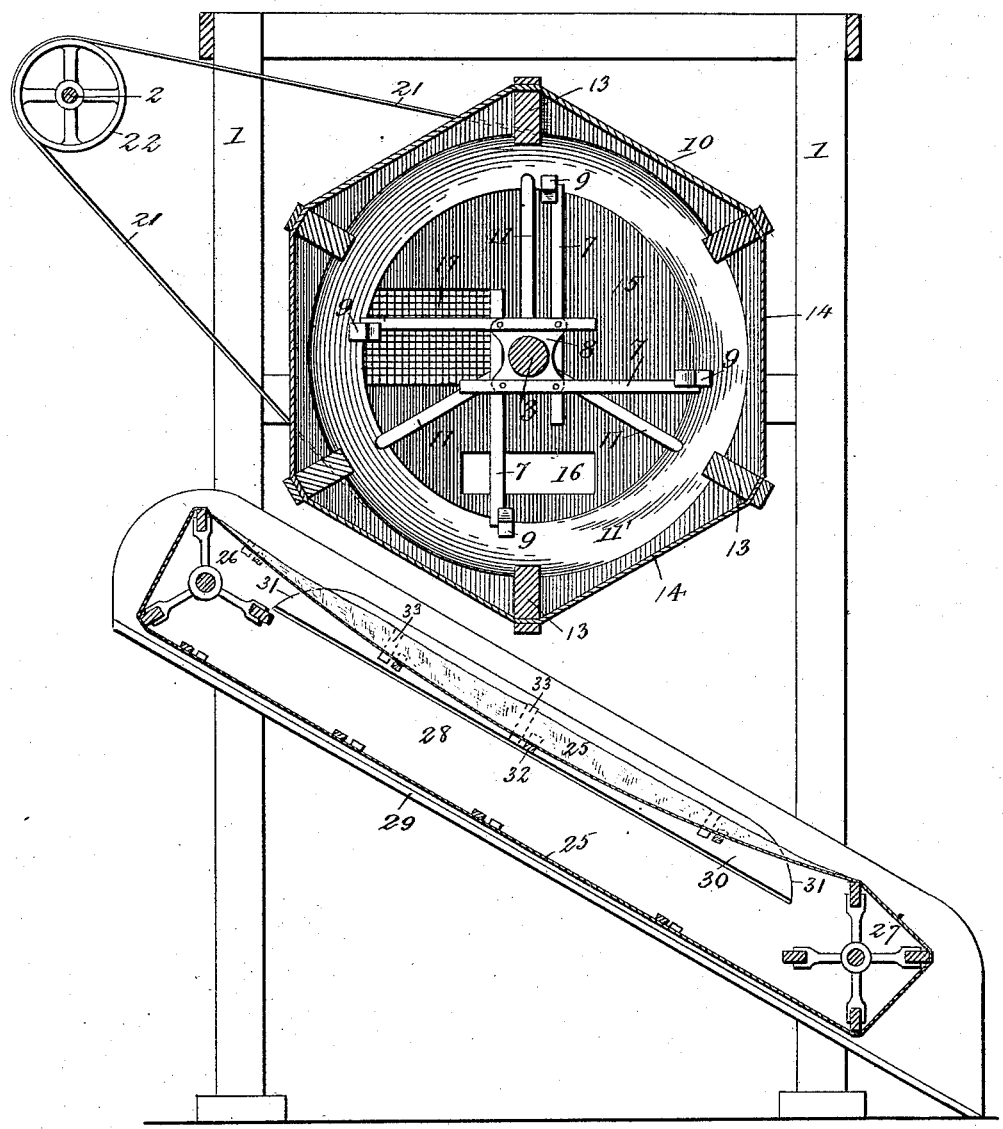

United States Patent Office.

ROBERT P. SCOTT, OF BALTIMORE, MARYLAND.

MACHINE FOR HULLING AND SEPARATING GREEN PEAS.

SPECIFICATION forming part of Letters Patent No. 387,318, dated August 7, 1888.

Application filed November 7, 1887. Serial No. 254,514. (No model.)

*To all whom it may concern:*

Be it known that I, ROBERT P. SCOTT, a citizen of the United States, residing at Baltimore, in the State of Maryland, have invented certain new and useful Improvements in Machines for Hulling and Separating Green Peas; and I do hereby declare the following to be a full, clear, and exact description of the invention, such as will enable others skilled in the art to which it appertains to make and use the same.

My invention has relation to machines for hulling or releasing green peas from their pods or hulls and subsequently separating the same, and is designed as an improvement on the machine forming the subject of an application for Letters Patent filed by Charles P. Chisholm and John A. Chisholm, January 3, 1887, Serial No. 223,170; and it consists in the improved construction and arrangement or combination of parts of the same, as hereinafter fully disclosed in the description, drawings, and claims.

The object of my invention is to provide for a perfect hulling or removal of peas from their pods and a subsequent separation of said peas from the pods and dirt, and to accomplish the same by simple means; and to this end I employ a machine of the construction which I shall now proceed to describe, and which is illustrated in the accompanying drawings, in which the same numerals of reference indicate the same or corresponding parts in all the figures, and in which—

Figure 1:
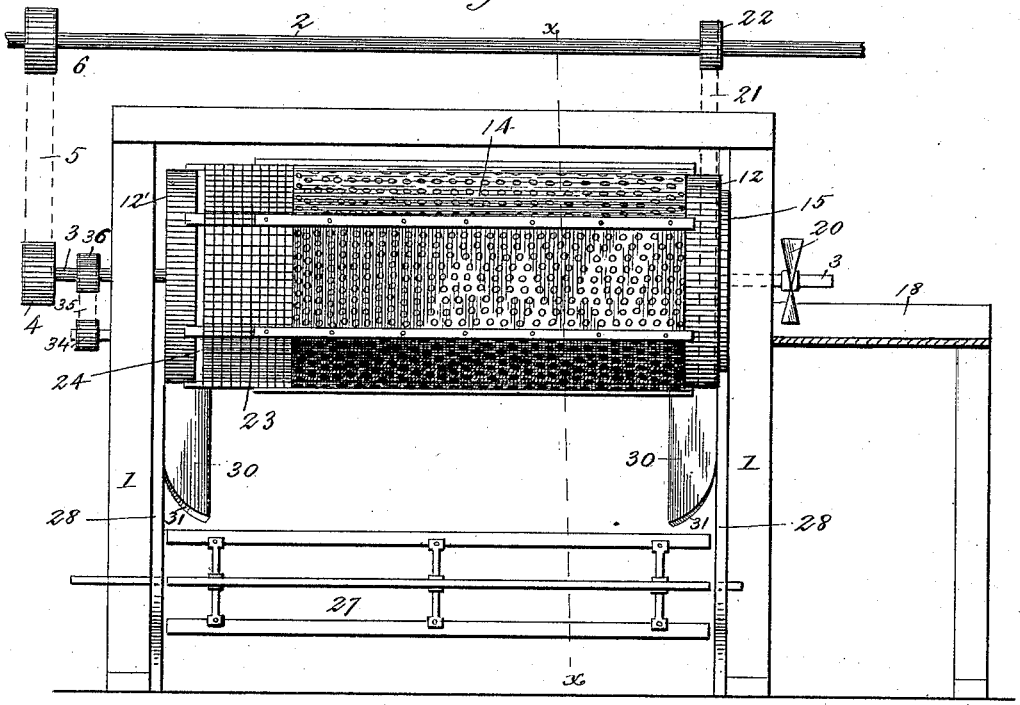
Figure 3:
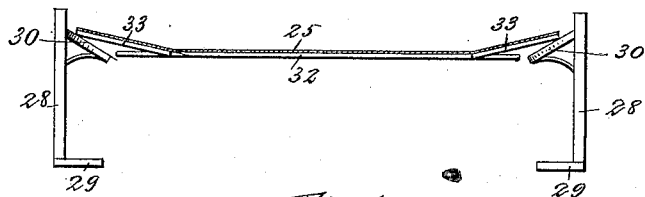
Figure 4:
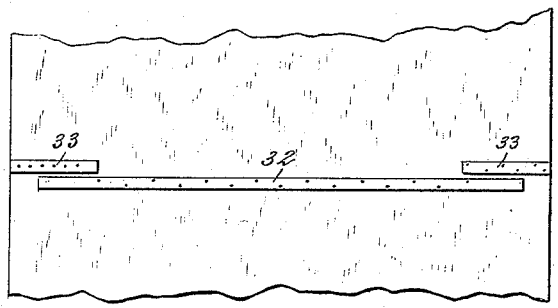

Figure 1 represents a side elevation of the machine with the endless apron removed from the prismatic rollers or reels; Fig. 2, a transverse sectional view of the entire machine, taken on line *x x*, Fig. 1; Fig. 3, a detail view of the side boards, guide-flanges, and the apron, showing said side boards and guide-flanges in end elevation and the apron in section; and Fig. 4, a detail plan view of a portion of the inside of the apron.

Referring to the several parts of the machine by numerals, 1 1 indicate the supports or frame of the machine, which is operated from the drive-shaft 2, which is suitably mounted or journaled and receives revolving motion from any suitable source of power.

A shaft, 3, extending longitudinally of the machine and suitably journaled in the supports or frame thereof, is provided with a pulley, 4, at one end, to which revolving motion is imparted from the drive-shaft 2 by means of a belt, 5, passing over said pulley, and a pulley, 6, upon said drive shaft, or by any other suitable gearing.

The shaft 3 is provided with radiating arms 7, secured to the opposite faces of square hubs 8, fitted upon said shaft; and to the outer ends of said arms are secured beaters or impact-openers 9, which are arranged slightly oblique to the axis of the shaft for the purpose of feeding the pods of peas toward the discharge end of the machine. I have not shown the construction and arrangement of these beaters or impact-openers in the drawings, as the same form no part of my invention.

The prismatic cylinder 10 is supported upon suitable bearings, (not shown,) which are loosely journaled upon the shaft 3 and provided with radiating arms 11, which extend outwardly and are attached to the inwardly-projecting flanges 11' of the heads of said cylinder. This cylinder is composed of the heads 12 and 12', the longitudinal bars or ribs 13, which form or define its prismatic outline, and of a covering, 14, of japanned leather, or so-called "patent leather," which is secured upon the ribs and provided with perforations of a suitable size to allow the hulled peas to pass out through them. At the feed end of the cylinder is rigidly secured to the frame or supports of the machine a circular disk, 15, which fits snugly within the head-flange 11', and is provided with a feed-aperture, 16, and also with a screen-covered aperture, 17, which permits the contents of the cylinder to be inspected, and at the same time admits air into said cylinder.

The shaft 3 extends out at one end over a feed-trough, 18, the end of which projects into the feed-aperture 16 of the stationary disk 15, and this end of said shaft is provided with a feed-screw or propeller, 20, which serves to loosen up the unhulled peas placed in the trough and to force them into the cylinder. The head 12 of this cylinder also serves as a pulley-rim, around which passes a belt, 21, which is also passed around a pulley, 22, upon the drive-shaft, so that when the latter is revolved the shaft 3, provided with the beaters or impact-openers 9, will receive a rapid revolving movement, while the cylinder will be revolved in the same direction as said shaft and impact-openers, but at a slower rate of speed. The leather covering of the cylinder extends nearly to its discharge end, while its remaining portion is covered with wire-netting 23 of a mesh sufficiently large to admit of the open hulls or pods being freely discharged therethrough. This netting may be extended and attached to head 12', or it may not be extended so far, so as to leave an annular space or opening, 24, between the end thereof and said head, for the purpose hereinafter stated. When said netting is extended and attached to said head, the rear or discharge end of the cylinder will be left open.

An endless apron, 25, of canvas or other suitable material, passes over two prismatic rollers or reels, 26 and 27, which are arranged at different heights beneath the cylinder. These prismatic rollers or reels are made in open or skeleton form, as shown in the drawings, for lightness, convenience, and cheapness of construction; but, as is obvious, they may be made solid and still perform the same functions. The higher roller or reel, 26, is shown as provided with three sets of bars or blades, and consequently is triangularly prismatic in form, while the lower roller or reel, 27, is provided with four sets of bars or blades, making it squarely prismatic in form; but either or both of them may be made triangular, square, or of other prismatic contour.

The apron is prevented from lateral movement by means of inclined side boards, 28, which are provided with inwardly-projecting flanges, 29, upon their lower edges, which are arranged at right angles to said boards and serve to support the lower portion of the apron during its travel, and to the inner sides of said side boards, above the flanges 29, are also secured inwardly-projecting inclined guide-flanges 30, having rounded ends 31 and serving to raise the side edges of the upper portion of the apron, whereby the hulled peas are directed toward the middle of said apron and are prevented from rolling over at its edges. The apron is provided with long transverse slats 32 upon its inner side, which serve to support it transversely, and at the ends of these slats, which do not extend entirely to the edges of the apron, are short slats 33, which are so secured to the apron as to overlap the ends of the long slats. These short slats or strips will be tilted up at their outer ends as they meet the ends of and pass along the inclined guide-flanges; also, they will cause the side edges of the upper portion of the apron to be raised, will prevent the peas and hulls or open pods from falling over its edges, and will roll the peas and hulls toward the middle of the apron, where at the same time they will be subjected to the shaking or vibratory action of the apron which it receives by passing over the prismatic rollers or reels. Under this construction and arrangement of parts the apron will not only move straight over the skeleton rollers or reels, but will be raised and lowered or vibrated from end to end by said rollers or reels without permitting any of the hulled peas or open pods to escape at its edges. A simple, easy, or gentle vibration of the apron in a perpendicular plane is not what is effected by these prismatically-shaped rollers or reels; but as they revolve and present their angles in different positions they operate to impart sudden impulses to said apron, resulting in intermittingly slackening and tigthening or stretching the same and quickly tossing upward the superposed peas and hulls.

The shaft of the upper skeleton roller or reel is provided with a pulley, 34, over which passes a belt, 35, which passes around a pulley, 36, upon the shaft 3. These parts impart revolving motion to the skeleton rollers and apron, causing the upper surface of the latter to travel in an upward direction.

The operation of my improved machine is as follows: The peas in the hulls or pods are fed into the slowly-revolving cylinder by the propeller or feed screw. They are then elevated to a point above the horizontal center of said cylinder by means of its interior longitudinally-arranged ribs. They then fall from said ribs, and in their descent are struck with sudden or impact blows by the rapidly-revolving openers or beaters, which split the pods or hulls, release the peas, and throw them against the inner sides of the cylinder. The released peas then pass to the lower surface of said cylinder, drop out of the same mainly through the perforation in the leather-covered portion thereof, and fall upon that part of the inclined apron which is directly beneath, down which they roll, notwithstanding the upward movement of the upper surface of said apron, and are delivered into any suitable receptacle, the hulls or open pods and the refuse being carried over the upper end of the apron. The hulls or open pods are fed toward the discharge end of the cylinder by the obliquely-arranged beaters or openers, (not shown,) and pass out through the large meshes of the wire-netting at that end, the said netting serving to deliver the hulls loosely and separately upon the apron and to scatter them out over a larger surface than would be possible were said netting not used and the hulls discharged at the rear end of the cylinder or through the annular space or opening 24, as in either of the latter events the hulls or open pods would be dumped out upon the apron in a mass and prevent any peas that may remain in said hulls or pods from being properly separated therefrom. Thus it will be evident that the released peas and open pods or hulls are delivered out of the cylinder at different points, fall upon the inclined apron at different points, and remain practically separate from each other while being agitated and delivered, respectively, at the lower and upper portions of said apron. Any open pods or hulls that are too large or from other cause fail to pass through the meshes of the wire-netting are discharged through the opening 24, and any peas that may remain in the open pods or hulls that fall upon the apron will be shaken out by the agitating action of the same, caused by its passing over the prismatic rollers or reels, whereupon the released peas will roll down and off the apron, while the hulls and any refuse mingled therewith will be carried up and discharged from the upper end of said apron.

In running over the prismatic reels or skeleton rollers the apron will be kept sufficiently stretched or tightened, and, also, at the same time the shaking or vibrating motion will be imparted to the entire apron, and thus a much better effect produced than is incident to the jarring of aprons by knockers and the like.

It is a well-known fact that it is extremely difficult to cause a wide belt or apron of canvas or other material to run straight over rollers and at the same time permit of the necessary vibration for effecting a proper separating action, and, so far as I am aware, these results have hitherto been but indifferently obtained. In my machine, as stated, the apron is not only caused to run straight, but receives an abundance of vibration, and also prevents the peas and hulls from escaping over its edges. I accomplish the result of keeping the apron straight in its passage over the rollers by providing it with the interior transverse slats and causing them to project against the side boards. These slats, although overlapping at their adjacent ends, serve the same purpose as would solid slats, so far as guiding or keeping the apron straight is concerned; but at the same time, owing to their peculiar construction and arrangement, they will bend out of a straight line, but not sufficiently to prevent their ends from forcibly pushing against the side boards. This bending or hinging action of the slats at their ends also permits the apron to be raised at its sides or edges, so as to roll the peas toward its center, and, also, it allows said apron to receive a greater vertical throw or toss than would be incident to the use of solid or unjointed slats running its entire width, since, were the latter used, their solid ends would rest upon the inclined guide-flanges of the side boards, and thus prevent the full drop of the apron and diminish its vibration. This apron while in operation supports a considerable weight of peas and hulls, and this causes more or less friction upon and wear and tear of said apron as it passes over the rollers and against the side boards, in time rendering it necessary to substitute one or more new aprons. For this reason I contemplate furnishing extra aprons with my machine, or subsequently supplying them as separate articles of manufacture and sale.

An important distinction between my machine and that disclosed in the application above referred to resides in the fact that my apron extends the full length of the cylinder, so that the hulled peas and such dirt as pass through the perforations of said cylinder and fall upon the apron will lie upon one portion thereof, while the open pods or hulls and such peas as may be mixed therewith will be carried along toward the rear end of said cylinder, pass out through the wire-netting or the opening and fall upon another portion of said apron, whereas in practice the apron of the machine embraced in the application named does not extend the entire length of the cylinder and has no agitation for separating the hulled peas from the mass of open pods or hulls which fall at the end of the cylinder, and consequently a perforated chute has to be employed for the open pods or hulls to be discharged upon. As stated, in my machine the apron runs straight and true, receives the necessary vibration for effecting proper separation, and prevents the hulled peas from rolling over at its edges.

It is obvious that minor changes can be made in the details of my invention without essentially departing from the principle thereof—as, for instance, any textile or other fabric having meshes or openings sufficiently large for the free discharge of the open pods or hulls may be employed in lieu of the wire-netting at the rear end of the cylinder.

Having thus fully described the construction and arrangement of the several parts of my invention, what I claim as new is—

1. In a machine for hulling and separating green peas, the combination of an inclined endless separating-apron provided with transverse overlapping slats on its inner side, prismatic rollers for moving and agitating said apron, and side boards having inwardly-projecting inclined flanges for raising the upper edges of said apron, substantially as described.

2. In a machine for hulling and separating green peas, the combination of an inclined endless separating-apron provided with transverse overlapping slats on its inner side, two prismatic rollers for moving and agitating said apron, and side boards provided with guide-flanges at their lower edges for supporting the edges of the lower portion of said apron, substantially as described.

3. In a machine for hulling and separating green peas, the combination of an inclined endless separating-apron provided with overlapping transverse slats on its inner side, two prismatic rollers or reels for moving and vibrating said apron, inclined side boards provided with guide-flanges upon their lower edges for supporting the edges of the lower portion of said apron, and with inclined guide-flanges for raising the edges of the upper portion of said apron, substantially as described.

4. In a machine for hulling and separating green peas, an endless separating-apron provided with long cross-slats upon its inner side, which extend nearly to its edges, and with short slats overlapping the ends of said long slats and extending quite to its edges, substantially as described.

5. In a machine for hulling and separating green peas, an endless inclined separating-apron provided with transverse slats arranged on the inside thereof, in combination with the rollers and the vertical side boards arranged at the sides or edges of said apron and operating to keep the same straight upon said rollers, substantially as described.

6. In a machine for hulling and separating green peas, the combination of two prismatic rollers or reels journaled at different heights, an endless separating-apron provided with long cross-slats upon its inner side, which extend nearly to its edges, and with short slats overlapping the ends of the long slats and extending to the edges of said apron, and side boards provided with guide-flanges at their lower edges for supporting the edges of the lower portion of the apron, and with inwardly-extending inclined guide-flanges having rounded ends and serving to raise the short slats and edges of the upper portion of said apron, substantially as described.

7. In a machine for hulling green peas and separating the same from their hulls or pods, the combination of a revolving prismatic separating-cylinder provided with a covering for the greater portion of its length having round perforations of a sufficient size to allow hulled peas to drop therethrough, and with a covering for the remainder of its length having larger meshes of a sufficient size to allow the hulls or pods to drop therethrough, and hulling devices arranged within said separating-cylinder, with a vibrating raised-edge upwardly-traveling separating-apron arranged beneath and extending the entire length of said cylinder, whereby in the co-operation of said cylinder and apron the released peas and open pods are delivered out of the former at different points, fall upon the latter at different points, and are kept practically separate from each other while being agitated, and respectively delivered at the lower and upper portions of said aprons, substantially as described.

In testimony whereof I affix my signature in presence of two witnesses.

ROBERT P. SCOTT.

Witnesses:
SCHUYLER DURYEE,
TOM R. STUART.